May 5, 1964
W. KREBS
3,132,053
GALVANIC PRIMARY AND SECONDARY ELEMENT
OR CELL WITH THREE ELECTRODES
Filed Jan. 24, 1961
2 Sheets-Sheet 1
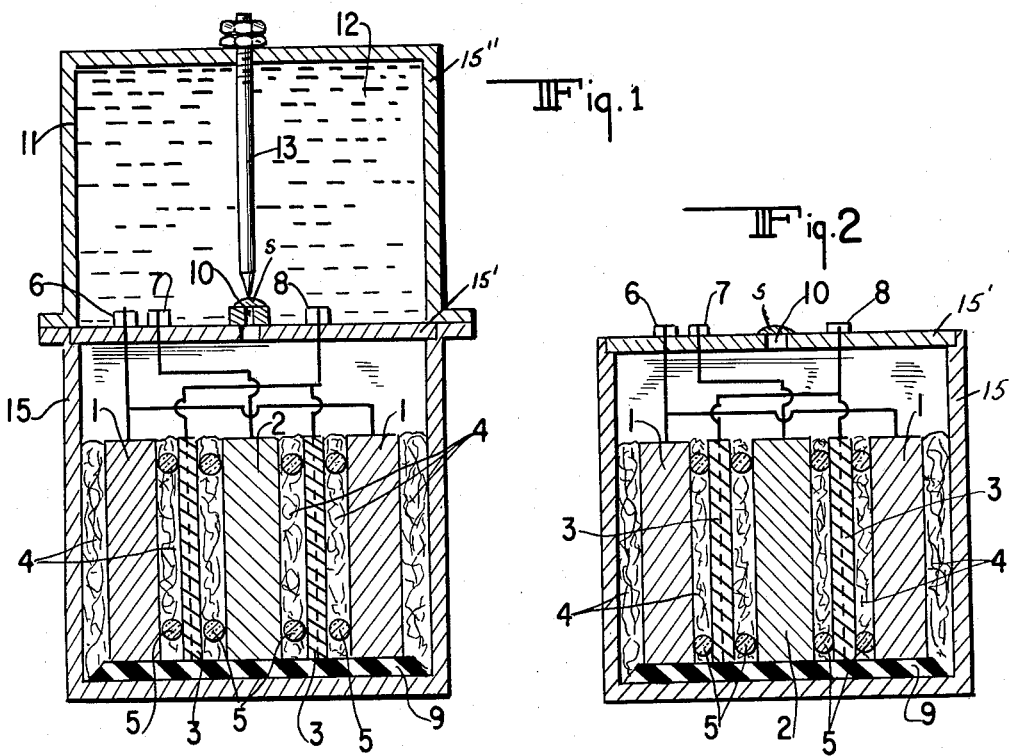
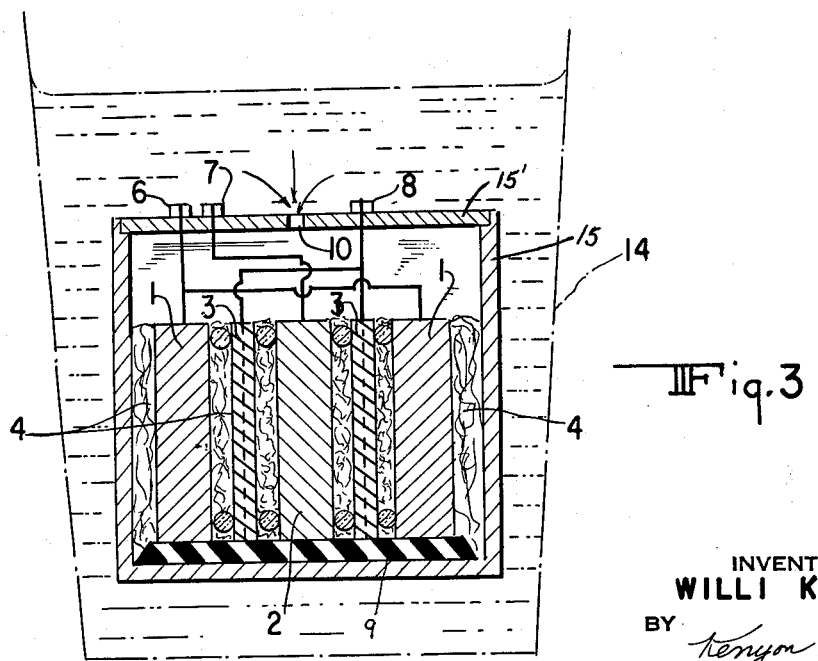
INVENTOR
WILLI KREBS
BY
Kenyon & Kenyon
ATTORNEYS

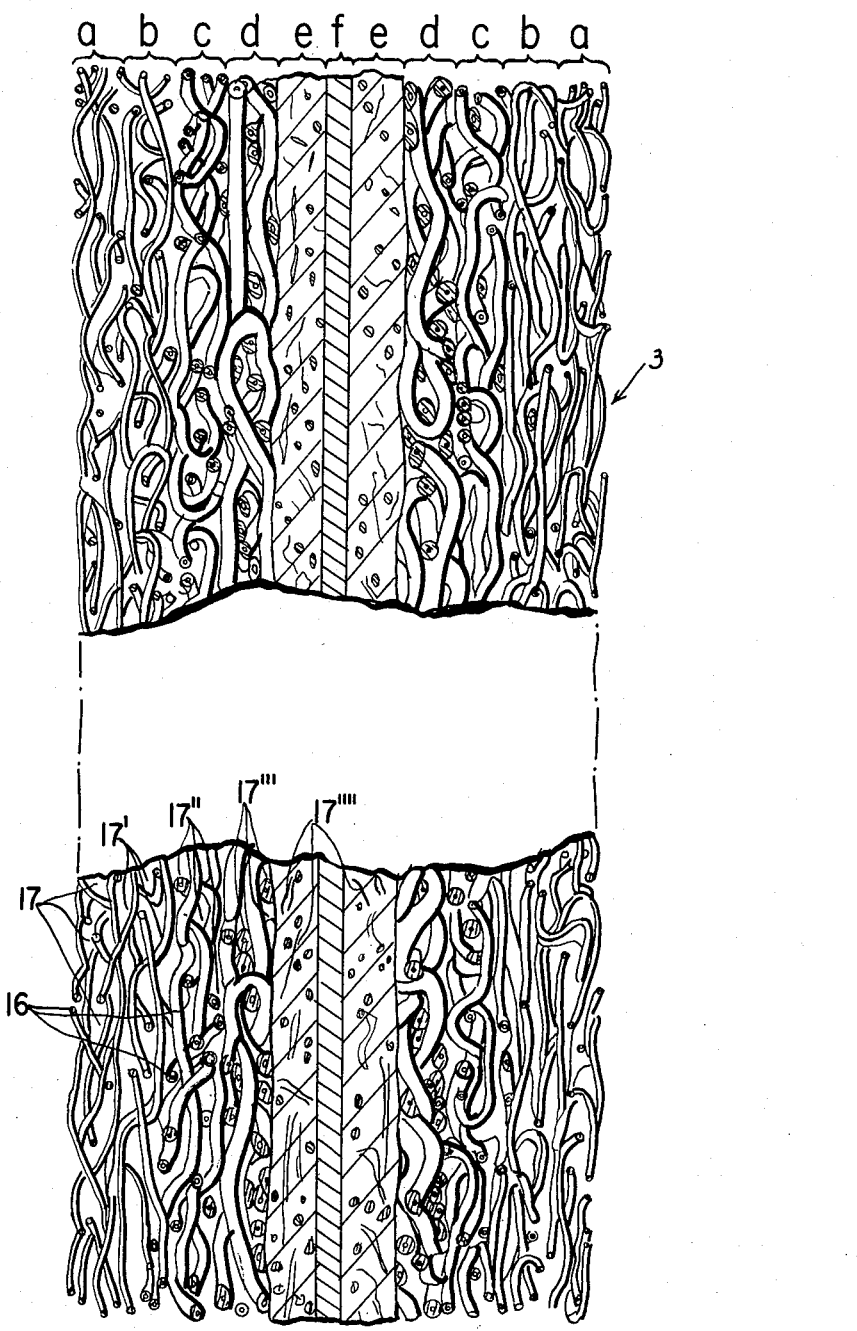

3,132,053
GALVANIC PRIMARY AND SECONDARY ELEMENT OR CELL WITH THREE ELECTRODES
Willi Krebs, Schwalbacherstrasse 3, Wiesbaden, Germany
Filed Jan. 24, 1961, Ser. No. 84,704
8 Claims. (Cl. 136—3)

The invention relates to a galvanic primary and secondary element or cell with three electrodes and an alkaline electrolyte.

Galvanic elements or cells with alkaline electrolytes as primary as well as secondary elements or cells in many varied forms are known and in use. In the less known forms of the alkaline primary element or cell the anode is, for instance, of nickel hydroxide, cobalt hydroxide or similar materials which are deposited into a conductive, electrolyte-resistant and porous supporting frame, while the negative electrode is usually built of zinc. The zinc electrode may be constructed in a number of ways, as for instance with the use of thin zinc metal foils or sheet-like foils on which there has been sprayed additionally zinc metal powder in order to increase the surface, or else to which has been applied as by sintering, zinc wool, of zinc shavings, or other similar zinc-like matter.

In order to eliminate discharges during the storing, the electrolyte is placed during the storage period in a separate container from the electrodes which in such an arrangement are built of massive metal or carbon. For such purpose there has also been suggested a third electrode used as an auxiliary and which is constructed of zinc. This latter electrode dips into the electrolyte during the storage of the charged element and this electrode has the purpose of eliminating the discharge of the negative electrode of the element or cell due to the fact that it is connected through a resistance with the negative electrode.

The invention refers to the combination of a galvanic primary and secondary element or cell consisting of a negative electrode, for instance made of iron or cadmium, as well as of a positive electrode, for instance of nickel hydroxide, with a third electrode built of a metal soluble in alkaline electrolytes, as for instance zinc, and of an electrolyte, as for instance an alkaline (potash) (KOH) solution. In accordance to the invention the third electrode which is soluble in the electrolyte is positioned between the other two electrodes which are intended for the alkaline accumulator and is about of the same size and shape as the electrodes of the said accumulator, forming together with one of the two accumulator electrodes a galvanic primary element. By using such a combination, there is attained, in comparison with the heretofore known elements or cells, the particular advantage that, after the dissolution of the soluble electrode, that is to say after having consumed the galvanic element, the alkaline accumulator may be additionally discharged. This has a result that the discharge time of the element or cell is doubled merely by the addition of another electrode. The alkaline accumulator can thereafter be again charged and used just as any other collector. This advantage of the element or cell in accordance with the invention gains particular importance when it becomes necessary to have, aside of the regular power source, a second reserve power source which latter is of particular importance in connection with radio-soundings used for weather forecasts, space measurements, torpedos, mines, etc.

In a preferred form of execution of the invention, the metal of the third electrode is deposited on an electrically non-conductive support made of such type of porous material which after the dissolution of the third electrode absorbs the electrolyte of the remaining alkaline collector. Using this form of execution there is the particular advantage that immediately after the dissolution of the third electrode, the alkaline accumulator is fully suitable for operation.

In order to be able to store the element or cell according to the invention for an unlimited time, it is necessary during storage to store the electrolyte which is necessary for the accumulator in a container separately from the electrodes. According to the invention, the element or cell housing with the inserted, charged and dry electrodes must be evacuated before adding the electrolyte. This evacuation offers the advantage that it is possible to use porous electrode plates.

The clean and perfect dissolution of the third electrode is best assured by coating its exterior facings with the soluble metal in a decreasing pattern of thickness, or density.

The third electrode is preferably contructed of an amphoteric hydroxide-forming metal such as for instance zinc which is deposited on a porous non-conductive support or carrier. This support or carrier for the third electrode's material comprises porous, electrically non-conductive webbings or fabrics made of organic or inorganic fibres, matted or felted fibre materials, such as paper, other cellulosic material, etc., glass powder or sintered plates of other non-soluble and non-conductive pulverized materials on which the metal may be deposited in the usual manner. According to the invention the third electrode, the contruction of which shall be described further in detail, comprises several metalized supporting layers.

When storing the alkaline element or cell the electrodes and the electrolyte are kept separate from each other. By preference the container for the electrolyte is attached directly to the housing of the element or cell and equipped with a device which permits operation from the outside of the container of an opening for the admission of the electrolyte into the electrode bearing container.

It is advisable to measure the amount of the electrolyte contained in the attached container in such manner that it is sufficient to fill the housing of the element or cell as the result of the suction created by the vacuum in the latter without admitting any outside air into the housing of the element. In another type of construction, the electrolyte may be stored in a container entirely separated from the housing of the element or cell and wherein the interior dimensions of such separate container are larger than the exterior dimensions of the housing of the element or cell with a content capacity about twice as large as that of the housing of the element or cell.

In the manufacturing procedure of the element or cell in accordance with the invention, especially of the third electrode, it is advisable to coat several supports for the metal of the third electrode, for instance fibre fabrics with a thin coating of the electrically conductive same material of which the third electrode is to be built. The thicknesses of these layers are subsequently individually increased in each fibre support and these fibre supports with the increased metal coating are stacked on top of each other in such manner that the fibre supports with the most increased metal deposits are placed in the center. At about the center of the stack of metal coated fibre supports there is inserted a foil made of the same metal coating material. Thereupon, the metalized fibre supports and the metal foil are combined into a unitary piece, for instance by gluing, compression or sintering and the so constructed electrodes are then trimmed to the desired size, or stamped out to desired size, etc. The thin electrically conductive initially deposited metallic layer can be obtained by metallic vapor deposition of the fibres in a high vacuum or by metallic vapor deposition of the fibres in the presence of indifferent and inert gasses by application of a vapor of a decomposing chemical compound of the metal required for the third electrode, or by any other known procedure, as for instance cathode pulverization, or the like.

Other details of the alkaline element or cell in accordance with the invention, as well as of the procedure for each step of manufacture will become apparent from the following description and from the accompanying drawing of the described examples of invention.

In the drawing:

FIG. 1 is a cross section of an element or cell housing with charged electrode plates above which the electrolyte is retained in a firmly attached separate container;

FIG. 2 is a cross section of an evacuated and subsequently closed element or cell housing with charged electrode plates;

FIG. 3 is a cross section through an opened cell or element housing as per FIG. 2 submerged in electrolyte and into which electrolyte has already been drawn by the vacuum in said housing; and FIG. 4 is an enlarged cross section of the third or dissolution electrode.

The triple electrode cell or element contemplated by the present invention comprises as may be seen from FIG. 1 the positive battery electrode 1, the negative electrode 2 and the third or dissolution electrode 3. During the use of the element these three electrodes are submerged in the usual electrolyte solution used for alkaline collectors, such as for instance a KOH solution having a density of 1.2. Each one of the three mentioned electrodes may consist of one or several plates. It is advisable to maintain the following sequence of the electrodes: Positive battery electrode 1, dissolution or third electrode 3, negative battery electrode 2, dissolution or third electrode 3, positive battery electrode 1, dissolution or third electrode 3, etc. Between each battery electrode 1 or 2 and the neighboring dissolution or third electrode 3 there is a separator layer of separating material 4, which for instance may consist of inorganic or organic tissues as for instance cellulose or synthetic fabrics of a super-polyamide base or similar material. In order to maintain the exact distance between the electrodes, there are provided small spacing rods 5 made of glass or synthetic material, in between which the separators 4 are interposed.

The cell or element housing 15 is closed all around and the attachment terminals 6, 7 and 8 with leads to the electrodes 1, 2 and 3 are introduced through the upper wall 15′ of the housing being duly insulated therefrom and air-tight. In order to avoid short-circuits formations formed through eventually deposited metal between the electrodes the latter are set on insulating stilts 9. The wall of the housing 15 may be made of synthetic material, iron, carbon or other matter which will not be affected by the electrolyte and which does not permit the passage of gasses or electrolyte.

During the storage time the cell housing 15 is either maintained evacuated or is filled with an inert gas at about atmospheric pressure. While in the latter case in order to start the operation of the cell element it is necessary to inject the electrolyte by means of a hand pump through the electrolyte admission opening 10. In the case of evacuated cell housings, an auxiliary electrolyte filled container 11 is attached directly to cell housing 15 and surrounds the electrolyte admission opening 10 in cover 15′ thereof. The electrolyte 12 consists preferably of KOH solution of a density of about 1.2.

In the interior of the electrolyte housing 11 there is a rod 13 which extends through to the outside thereof and which with its point contacts the sealing closure S which closes off the electrolyte admission opening 10. In order to start the operation of the element, the electrolyte admission opening or fill hole 10 is opened by removing or puncturing seal S with the aid of rod 13. The vacuum that exists on the inside of cell housing 15 sucks the electrolyte from the container 11 into the cell housing 15 via opening 10.

From this cell or element now ready for operation there can now be drawn current between terminal clamps 6 of the positive battery electrode 1 and terminal 8 of the third or dissolution electrode 3 for as long a time as it takes to completely dissolve metal of electrode 3. From that moment on current may be drawn from terminals 6 and 7 of electrodes 1 and 2 in the heretofore usual manner. The switch or change from terminal 8 to terminal 7 may be effected in any desired manner as soon as the coating on the third or dissolution electrode is consumed, for instance automatically.

Dissolution electrode 3 is preferably built by coating a non-conducting support with metal, preferably zinc. As soon as the coating has been dissolved in the electrolyte the now again non-conducting support of said electrode 3 functions as a separator between the battery electrodes 1 and 2.

The seal S of the evacuated cell housing may be effected in various manners as for instance by soldering, or tightening of a screw valve, or by application of a metal foil, etc. The vacuum existing on the inside of cell housing 15 and the amount of the electrolyte fluid 12 contained in housing 11 should be adjusted to each other in such manner that at the time of starting the operation of the cell element, the cell housing is filled with electrolyte to about 5 to 10 mm. below the cover 15′. After the filling of the cell housing with electrolyte the container 11 is removed from the cell housing 15 and the electrolyte admission opening 10 shall be closed by a regular stopper for later filling and discharging. Prior to the first reloading of the thus remaining alkaline accumulator, it is advisable to renew the electrolyte, for instance with KOH solution of a density of about 1.2.

Another form of execution of the triple electrode cell or element as per the invention without an attached electrolyte container is shown in FIG. 2. In this form of execution the cell housing 15 with electrodes 1, 2 and 3 has been evacuated and the electrolyte fill opening 10 has been hermetically closed by a seal S. In order to start the operation of the cell or element in this form of execution, the entire cell housing 15 is submerged in a container 14 filled with alkaline electrolyte solution 12 of the type noted and the electrolyte admission opening 10 is opened during such submersion. The electrolyte 12 flows then into cell housing 15 just as shown in the case of the form of execution shown in FIG. 1.

In the embodiment shown in FIG. 4 relating to the third or dissolution electrode 3, the latter comprises five layers $a$ to $e$ which are attached on both sides of a metal foil $f$. The layer $a$ consists of a thin fabric of matted cellulose or synthetic fibres of a polyamide base. The individual fibres 16 of that fabric layer $a$ have been vapor-deposited in a high vacuum with zinc to a thickness of about one mu (micron). There is thus formed a porous composite into the pores 17 of which the electrolyte may penetrate and thus permeate the entire layer $a$. Layer $b$ consists mainly just as in the case of layer $a$ of a vapor-deposited fabric membrane composed of the above described matter. However, this membrane is subsequently galvanized with a layer of zinc of about 0.05 mm. thickness on top of the surfaces of the fibres. Herein the interspaces or interstices 17′ of layer $b$ are still large enough to permit the electrolyte to permeate freely the entire layer $b$. Layer $c$ is manufactured in the same manner as layer $b$ but on the surface of the matted fibres which have been vapor-deposited in a vacuum with zinc there has been applied a second or covering layer of zinc of about 0.1 mm. thickness. Even in this layer $c$ there still exists comparatively large interspaces or interstices 17″ into which the electrolyte can seep. Layer $d$ is manufactured in the same manner as layers $b$ and $c$, but in this instance the surfaces of the fibres that have been matted and vapor-deposited in a vacuum with zinc, there have been applied galvanically zinc layers of a thickness of about 0.2 mm. The interspaces 17‴ of this layer have already the form of more or less large pores which, however, permit the electrolyte to seep in. Finally, layer e is manufactured in the same manner as the layers b to d but the surface of the matted fibres which were vapor-deposited in a high vacuum are coated with a layer of zinc of about 0.3 mm. thickness. This has resulted that the pores 17'''' still existing in this layer have become comparatively small so that the electrolyte can only slowly penetrate into this layer while in the other layers a to d the metal has already been partially dissolved. During the dissolution process the electrolyte enlarges these pores 17'''' and gradually penetrates deeper into layer e until it has completely permeated it. In the core or center of the electrode 3 there is a zinc foil f which serves as a support of layers a to e and at the same time assures a definite current discharge. Foil f consists of rolled zinc metal and is, therefore, attacked only on its surface by the electrolyte.

The manufacture of the solution electrode 3 is effected as by the following example of execution:

The fabrics 16 which have been vapor-deposited with zinc under a high vacuum to a maximum coating of one mu (micron) and which consists for instance of cellulose fibres with a total thickness of 0.2 mm., are selectively coated galvanically in a zinc bath with layers of various thicknesses and are stacked upon each other in such manner that the layers with the lightest coating are placed on the outside while the gradually thicker layers are arranged toward the center. Toward about the center of the stack there is inserted a 0.5 mm. thick foil f of pure zinc. This stack of zinced fabrics a–e on f is compressed and is sintered at 480° under a protective or reducing atmosphere for about one hour. However, it is also possible to glue the individual layers a–e of the zinced fabrics to each other and to foil f with artificial resin under pressure. In both cases there is produced a unitary plate like mass out of which the electrodes 3 may be cut or stamped in the desired sizes. The assembled metalized supports 16 and the zinc foil f, as well as the fabric layers which are zinced on their outer facings with a coating of from about one mu (micron) and at the center with a coating of 0.2 to 0.3 mm., may be advantageously again galvanized in the zinc bath after the sintering step. After the second zinc galvanizing the dissolution electrodes 3 are dried and embodied in cell housing 15 in the manner described.

As electrodes (positive and negative) for the normally chargeable accumulator there may also be used electrodes of many varied constructions as for instance normal pocket or pencil electrodes as they are now used. However, there may also be used the newly developed large surface electrodes. The collector electrodes 1 and 2 are manufactured and activated in the usual manner. After activation they are charged in the electrolyte, preferably the same that will be used later for the cell or element, and are then dried in their charged condition and embodied into the cell housing 15 together with the dissolution electrodes 3.

Aside from using the especially mentioned zinc in the examples of execution described, other metals may be used for dissolution electrodes such metals being those which form amphoteric hydroxides, as for instance aluminum.

Although specific embodiments of the invention have been described variations are possible within the scope of the claims and are contemplated. There is no intention of limitation to the exact description herein presented.

What is claimed is:

1. A process for the manufacture of third electrodes for cells of the character described which are intended to dissolve in the electrolyte of the cell, comprising coating a plurality of non-conductive fiber fabric layer supports with a progression of thicknesses ranging from about one micron to about 0.3 mm. of conductive metal, stacking said fiber fabric layer supports in layers upon a core foil consisting of the same metal as the coating such that successively thicker coated layers are progressively arranged toward the center core foil, conductively uniting the stacked layers and foil and thereafter shaping the united assembly to the desired electrode dimensions.

2. The process according to claim 1 wherein the coating metal is selected from the group consisting of zinc and aluminum.

3. The process of claim 1 wherein each of the fibre fabric layers of non-conductive material are vapor-deposited with zinc in high vacuum to acquire a maximum thickness of one micron, and subsequently coating selected of these layers galvanically in a zinc bath to progressively increase the thickness of the final zinc coating thereon from a minimum of 0.05 mm. to a maximum of 0.3 mm. whereby there is obtained a plurality of zinc coated layers having coatings ranging in thickness from about one micron to 0.3 mm.

4. The process of claim 1 wherein each of the fibre fabric layers of non-conductive material are vapor-deposited with zinc in high vacuum to acquire a maximum thickness of one micron, and subsequently coating selected of these layers galvanically in a zinc bath to progressively increase the thicknesses of the zinc thereon from between a minimum of 0.05 mm. and a maximum of 0.3 mm., whereby there is obtained a plurality of zinc coated layers having coatings ranging in thickness from one micron to 0.3 mm., sintering the stacked layers at approximately 480° to unite all the layers and the foil, thereafter retreating the sintered united layers galvanically in a zinc bath, and then drying the resulting product.

5. A galvanic primary and secondary cell having a housing, an alkaline electrolyte, a negative electrode and a positive electrode together adapted to form a rechargeable accumulator, the active material of said negative electrode being composed of a metal selected from the group consisting of cadmium or iron and the active material of said positive electrode being composed of nickel hydroxide, a third electrode of metal soluble in said alkaline electrolyte and interposed between said negative and positive electrodes, the active material of said third electrode being composed of a metal selected from the group consisting of aluminum and zinc, electrically non-conductive separators between the electrodes and within the casing to prevent direct electrical contact of any two of the three said electrodes with each other, said third electrode forming a galvanic primary element with one of said positive and negative electrodes which discharges electrical energy during dissolution of said third electrode in said electrolyte, the said positive and negative electrodes thereafter in the same electrolyte being dischargeable additionally as a secondary cell, a separate terminal for each of said positive, negative and third electrodes external of the housing to which each of the electrodes is respectively connected, so that primary cell power may be derived from the cell first by connection to the terminal of the third electrode and the terminal of one of the other two electrodes, and secondary cell power may be derived from the cell thereafter upon completion of dissolution of the third electrode by connection to the terminals of the positive and negative electrodes.

6. A cell according to claim 5 in which the soluble metal of said third electrode is coated on electrically non-conductive supports formed of porous material, the metal coatings being progressively thicker from the outside to the inside of said support and having a thickness ranging from about one micron to about 0.3 mm., and said porous material being adapted to absorb the electrolyte of the resulting alkaline accumulator upon dissolution of said third electrode and to serve as an additional separator between the positive and negative electrodes upon such dissolution.

7. The cell according to claim 5 in which said third electrode has an electrically conductive metal foil support, and a plurality of stacked layers of fibre fabrics attached to each side of said foil, said fibre fabrics being coated with the same metal as said foil and said layers containing progressively increasing thicknesses of said metal from the outermost layer to the innermost layer and ranging in thickness from about one micron to about 0.3 mm.

8. A cell according to claim 5 including means for maintaining the electrolyte out of contact with the electrodes during storage and means for simultaneously maintaining the cell housing in an evacuated condition.

References Cited in the file of this patent

UNITED STATES PATENTS

| | | |
|---|---|---|
| 2,212,054 | Spicer | Aug. 20, 1940 |
| 2,627,531 | Vogt | Feb. 3, 1953 |
| 2,641,622 | Higgins et al. | June 9, 1953 |
| 2,680,699 | Rubin | June 8, 1954 |
| 2,807,658 | Hatfield | Sept. 24, 1957 |
| 2,852,592 | Salauze | Sept. 16, 1958 |
| 2,857,447 | Lindstrom | Oct. 21, 1958 |
| 2,934,581 | Dassler | Apr. 26, 1960 |
| 2,942,052 | Bourke et al. | June 21, 1960 |